(No Model.)

C. F. NOBLE.
DEVICE FOR COUPLING CHAIN LINKS.

No. 486,587. Patented Nov. 22, 1892.

Witnesses:

Inventor:
Cyrus F. Noble
by S. W. Bates
his atty.

UNITED STATES PATENT OFFICE.

CYRUS F. NOBLE, OF WEST BALDWIN, MAINE.

DEVICE FOR COUPLING CHAIN-LINKS.

SPECIFICATION forming part of Letters Patent No. 486,587, dated November 22, 1892.

Application filed November 30, 1891. Serial No. 413,466. (No model.)

*To all whom it may concern:*

Be it known that I, CYRUS F. NOBLE, a citizen of the United States, residing at West Baldwin, in the county of Cumberland and State of Maine, have invented certain new and useful Improvements in Chain-Couplings; and I do hereby declare the following to be a full, clear, and exact description of the invention, such as will enable others skilled in the art to which it appertains to make and use the same.

My invention relates to a temporary link or coupling for coupling together the links of a broken chain.

Chains are often broken in places where there is no blacksmith and where it is necessary to adopt some temporary means for coupling the broken ends. In these cases it is desirable to have a temporary link which may be used to couple together the broken ends and which may be applied without the necessity of heating or otherwise manipulating the iron.

My invention consists of a link which is bent or folded on its center to form an eye, into which eye a pin or rivet is adapted to fit. The ends of this link, when made, are not bent entirely together, but they are left a sufficient distance apart, so that the pin or rivet may be slipped laterally into the eye. One end of the U-shaped link which is thus formed is passed through the two links which are to be joined together and the pin or rivet is slipped into place in the eye. The ends of the U-shaped link are then pressed together. They may be hammered together or the strain on the connected links when the chain is in use will tend to draw them together sufficiently to hold the pin or rivet in place.

I illustrate my invention in the accompanying drawings, in which—

Figures 1, 2:
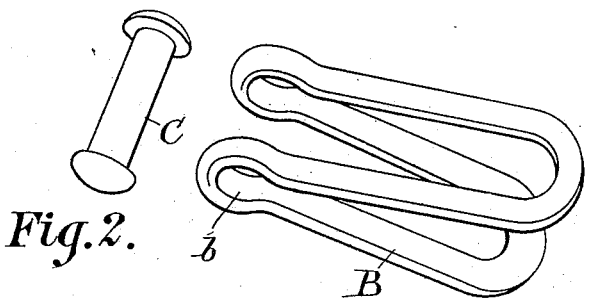
Figure 3:
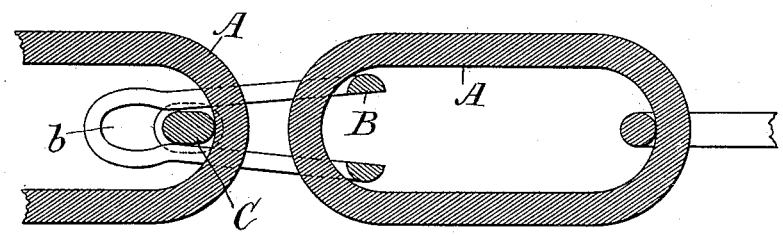
Figure 4:
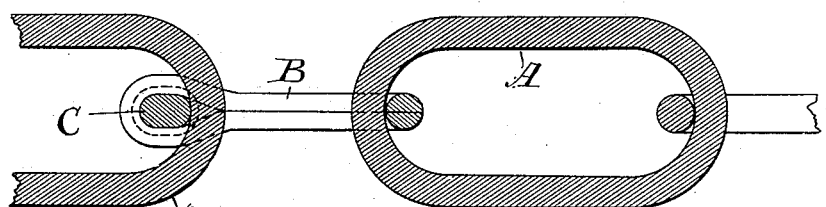

Figure 1 is a perspective view of the link after being bent. Fig. 2 is the pin or rivet. Fig. 3 is a longitudinal section showing the parts in place before the ends of the U-shaped link are finally bent together, and Fig. 4 is the same section showing the coupling complete.

A A represent the two links to be joined together. They may be the terminal links of a broken chain, or they may be two sections of new chain or any two links which it is desired to couple.

The link B is bent or folded on its center to form an eye $b$ at the point of bending. This eye $b$ is made of such size that it will fit a pin or rivet C, which I prefer to make with two heads, as shown. A U-shaped link is thus formed, over one limb of which is placed the two links to be joined. The pin or rivet C is now slipped laterally into the eye $b$, the ends of the link B having been left sufficiently far apart to allow this to be done. The free ends of the link B are now hammered or otherwise pressed together and the coupling is complete.

It will be seen that the coupling is very strong and that when once in place it cannot be easily removed by any accidental means.

If desired, it may be readily removed by prying apart the ends of the link B and slipping out the pin or rivet C.

This coupling is as strong as any welded link of its size and it may be used for forming new chains as well as for coupling together parts of old chains.

I claim—

A chain-coupling composed of a link partially doubled on its center to form an incomplete eye, combined with a double-headed bolt adapted to slip laterally into said eye, substantially as described.

In testimony whereof I affix my signature in presence of two witnesses.

CYRUS F. NOBLE.

Witnesses:
C. O. JAMESON,
S. W. BATES.